United States Patent [19]

Doi et al.

[11] Patent Number: 5,027,611
[45] Date of Patent: Jul. 2, 1991

[54] AIR CONDITIONER FOR USE IN AN AUTOMOTIVE VEHICLE

[75] Inventors: Shigetoshi Doi, Iwakuni; Taketoshi Matsushita, Hiroshima, both of Japan

[73] Assignee: Mazda Motor Corporation, Hiroshima, Japan

[21] Appl. No.: 599,360

[22] Filed: Oct. 18, 1990

[30] Foreign Application Priority Data

Oct. 19, 1989 [JP] Japan ................. 1-274314

[51] Int. Cl.[5] ................. F24F 7/00; G05D 23/00
[52] U.S. Cl. ................. 62/158; 62/182; 62/244; 98/2.01; 165/12; 165/43; 236/46 F; 236/49.3
[58] Field of Search ................. 62/186, 158, 182, 180, 62/157, 231, 243, 244; 236/49.3, 46 F, 46 R, 91 C, 91 R; 98/2.01; 165/42, 43, 16, 39, 40, 12

[56] References Cited

U.S. PATENT DOCUMENTS

| | | | |
|---|---|---|---|
| 4,408,713 | 10/1983 | Iijima et al. | 236/46 F |
| 4,858,677 | 8/1989 | Doi et al. | 98/2.01 |
| 4,860,552 | 8/1989 | Beckey | 62/158 |

FOREIGN PATENT DOCUMENTS 1-26498  8/1989  Japan .

Primary Examiner—Harry B. Tanner
Attorney, Agent, or Firm—Fish & Richardson

[57] ABSTRACT

Disclosed is an air conditioner for use in an automotive vehicle. The air conditioner includes a timer circuit for deciding whether or not a given period of time has elapsed after an engine of the automotive vehicle has been started, an air quantity controller for limiting the amount of air to be introduced into a passenger compartment for a given period of time after an air cooling operation has been started, a compressor controller for prohibiting the operation of a compressor of the air conditioner for the given period of time to be decided by the timer circuit, a temperature sensor for detecting the temperature of the passenger compartment, and a switch portion for starting the compressor. The timer circuit, the air quantity controller, the compressor controller, and the switch portion are all provided in an air conditioner control unit. The control unit increases the amount of air within the first period of time when the temperature detected by the temperature sensor is greater than a predetermined value and when the switch portion outputs no instruction within the given period of time decided by the timer circuit. Alternatively, the control unit increases the amount of air from within the second period of time longer than the first period of time when the temperature detected by the temperature sensor is greater than the predetermined value and when the switch portion outputs an instruction for starting the compressor within the given period of time decided by the timer circuit.

6 Claims, 5 Drawing Sheets

AIR CONDITIONER FOR USE IN AN AUTOMOTIVE VEHICLE

BACKGROUND OF THE INVENTION

1. Field of the Invention

The present invention relates generally to an air conditioner for use in an automotive vehicle, and more particularly, to an air conditioner capable of appropriately adjusting the amount of air to be introduced into the interior of an automotive vehicle at the time of starting the air conditioner so that the comfortability may be improved.

2. Description of the Related Art

When an air conditioner of an automotive vehicle parked outdoors in hot weather is started, a great amount of air is emitted from the air conditioner to a passenger compartment in order to rapidly lower the temperature of this compartment. However, it is impossible to cool the air immediately after the air conditioner starts operating because the temperature of cooling components, for example an evaporator and the like, is high. Therefore, a great amount of hot air is emitted into the passenger compartment, thus lowering the comfortability.

An air conditioner as disclosed in Japanese Utility Model Laid-open Application (unexamined) No. 61-142616 comprises a temperature detecting means for detecting the surface temperature of a heat exchanger mounted therein and a time measuring means for measuring the lapse of time after the air conditioner has been switched on. According to this disclosure, a relatively small amount of air is supplied to a passenger compartment when the temperature detected by the temperature detecting means is greater than a predetermined temperature and the period of time measured by the time measuring means is less than a predetermined period of time, thus preventing a great amount of hot air from being introduced into the passenger compartment at the time of starting the air conditioner.

Conventionally, even when an air conditioner is switched on in spring or autumn in which everybody does not feel so hot, a great amount of air is emitted into a passenger compartment in order to rapidly minimize the difference between the actual temperature of the passenger compartment and the setting temperature. Thus, there arises the problem that the comfortability is lowered.

In order to solve this kind of problem, when the temperature of the passenger compartment or the amount of solar radiation exceeds a predetermined value, the above-described control is performed to restrict the amount of air to a relatively small amount at the time of starting the air conditioner. It is further considered that when the temperature of the passenger compartment and the amount of solar radiation are less than respective predetermined values, the time required for increasing the amount of air from a predetermined small amount to a predetermined large amount is prolonged.

More specifically, when it is necessary to rapidly cool the passenger compartment because the temperature thereof or the amount of solar radiation exceeds the predetermined value, the amount of air fed from the air conditioner is rapidly increased to a large amount (Hi) after a starting control period T2' by the small amount (Lo) of air has elapsed as shown by a solid line in FIG. 1 or when the temperature of air from the air conditioner has become lower than a predetermined value. On the other hand, when the passenger compartment is gradually cooled because the temperature thereof and the amount of solar radiation are less than respective predetermined values, the amount of air is gradually increased to the amount (Hi), as shown by a dotted line in FIG. 1. Thus, not only a great amount of hot air is prevented from being introduced into the passenger compartment at the time of starting the air conditioner, but the passenger compartment can be rapidly cooled in summer and gradually cooled in spring or autumn.

Generally speaking, since a compressor of a refrigerator of an air conditioner is coupled to an output shaft of an engine, the compressor consumes part of the engine output. Accordingly, the engine output is reduced by the operation of the compressor, thus lowering the starting performance of the engine. It is, therefore, considered that the compressor is kept stopped for a predetermined period of time at the time of engine starting.

However, if the compressor is not operated when the engine starts, the cooling of the evaporator is delayed, which leads to the delay in starting the air cooling operation. As such, even though the amount of air is reduced for the predetermined period of time at the time of starting the air conditioner, it is difficult to effectively remove uncomfortableness of a driver or other passengers due to hot air introduced into the passenger compartment, particularly in summer.

SUMMARY OF THE INVENTION

The present invention has been developed to overcome the above-described problems.

It is accordingly an object of the present invention to provide an air conditioner of an automotive vehicle capable of restricting the amount of hot air introduced into a passenger compartment at the beginning of the air cooling and contributing to the improvement of the starting performance of an engine.

In accomplishing this and other objects, an air conditioner according to the present invention includes a time counting means for deciding whether or not a given period of time has elapsed after an engine of the automotive vehicle has been started, an air quantity limiting means for limiting the amount of air to be introduced into a passenger compartment for a given period of time after an air cooling operation has been started, a compressor control means for prohibiting the operation of a compressor of the air conditioner for the given period of time to be decided by the time counting means, a temperature detecting means for detecting the temperature of the passenger compartment, an instructing means for starting the compressor, and an air quantity control means for increasing the amount of air from a first amount to a second amount greater than the first amount.

The air quantity control means includes a first control means for increasing the amount of air from the first amount to the second amount within a first period of time when the temperature detected by the temperature detecting means is greater than a predetermined value and when the instruction means outputs no instruction within the given period of time decided by the time counting means, and a second control means for increasing the amount of air from the first amount to the second amount within a second period of time longer than the first period of time when the temperature detected by the temperature detecting means is greater than the predetermined value and when the instruction means outputs an instruction for starting the compressor within the given period of time decided by the time counting means.

The temperature detecting means may be replaced by a solar radiation detecting means for detecting the amount of solar radiation.

Furthermore, the air conditioner may be provided with both the temperature detecting means and the solar radiation detecting means. In this case, the amount of air is increased from the first amount to the second amount within the first period of time when at least one of the temperature detected by the temperature detecting means and the amount of solar radiation detected by the solar radiation detecting means is greater than a predetermined value and when the instruction means outputs no instruction within the given period of time decided by the time counting means. Otherwise, the amount of air is increased from the first amount to the second amount within the second period of time longer than the first period of time when at least one of the temperature detected by the temperature detecting means and the amount of solar radiation detected by the solar radiation detecting means is greater than the predetermined value and when the instruction means outputs an instruction for starting the compressor within the given period of time decided by the time counting means.

According to the above-described construction, when an instruction for starting the compressor is given during the stop period of the compressor after the engine starting i.e., at the beginning of the air cooling, the period of time for lowering the temperature of an evaporator is substantially restricted to a short period. In the case where it is difficult to effectively restrict hot air from being introduced into the passenger compartment even though the control for reducing the amount of air is performed for a predetermined period after the starting of the air cooling, the amount of air is gradually increased from the first amount to the second amount. As a result, not only the starting performance of the engine can be improved, but the introduction of hot air into the passenger compartment can be minimized at the beginning of the air cooling.

BRIEF DESCRIPTION OF THE DRAWINGS

This and other objects and features of the present invention will become more apparent from the following description taken in conjunction with the preferred embodiments thereof with reference to the accompanying drawings, throughout which like parts are designated by like reference numerals, and wherein.

DETAILED DESCRIPTION OF THE INVENTION

Figure 2:
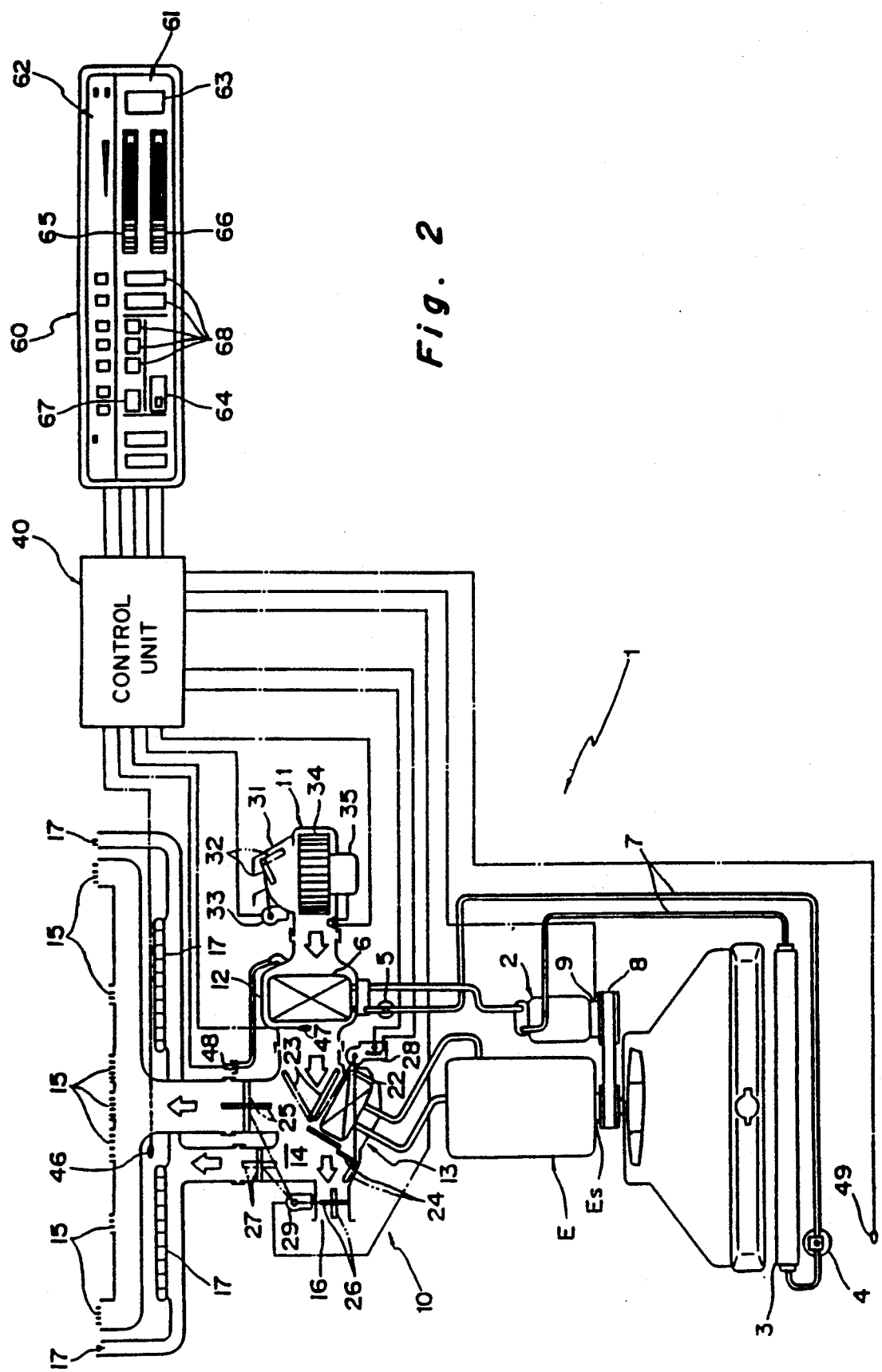
FIG. 2 is a schematic diagram of an air conditioner according to the present invention.

Referring now to the drawings, there is shown in FIG. 2 an air conditioner 1 according to the present invention, which comprises a compressor 2 connected to an output shaft Es of an engine E through a power transmitting means 8 such as a transmission belt, a condenser 3 positioned in the front end portion of an engine room, a refrigerant receiving tank 4 of a constant volume disposed downstream of the condenser 3, and an expansion valve 5 positioned downstream of the tank 4 and immediately upstream of an evaporator 6. These components are connected by refrigerant tubes 7 in series in this order, thus composing a refrigerating cycle of the air conditioner 1. The evaporator 6 constitutes the main portion of a cooling unit 12 for cooling air introduced into an air conditioning unit 10.

A gas refrigerant which has been inhaled and compressed by the compressor 2 becomes high in temperature and pressure and is fed to the condenser 3 in which the gas refrigerant is cooled and condensed into a liquid refrigerant as a result of the heat exchange with air introduced in an automotive vehicle when the vehicle is running. The liquid refrigerant is fed to the refrigerant receiving tank 4 and then to the expansion valve 5 in which the pressure of the liquid refrigerant is reduced to a predetermined pressure and adiabatically expands. Then, the liquid refrigerant is fed to the evaporator 6 in which it evaporates by absorbing the heat from the surrounding air. The evaporated refrigerant is again inhaled and compressed by the compressor 2. The refrigerant cycles in this manner.

An electromagnetic clutch 9 is interposed between the output shaft Es of the engine E and a drive shaft of the compressor 2 so that both of the latter can be connected to each other and disconnected from each other by the former. When the engine E is in operation, the electromagnetic clutch 9 is turned on. As a result, the compressor 2 is driven while it is consuming part of the engine power. The electromagnetic clutch 9 is connected to an air conditioner control unit 40 comprising a microcomputer so that signals are transmitted therebetween. The electromagnetic clutch 9 is turned on or off in response to an instruction signal transmitted thereto from the control unit 40.

The air conditioning unit 10 comprises, sequentially in the order from the upstream side, a blower unit 11 for taking air to be air-conditioned and supplying the air to the air conditioning unit 10, a cooling unit 12 for cooling the air by the evaporator 6, and a heater unit 13 including a heater core 22 for heating the air by the use of cooling water of the engine E. The heater unit 13 is connected to an air conditioning duct 14, which introduces the air to the interior of the automotive vehicle. The air conditioning duct 14 communicates with air outlets 15, a heater outlet 16, and defroster outlets 17. The heater unit 13 is provided with air mixing doors 23 and 24 for adjusting the amount of air passing through the heater core 22 so as to control the temperature of the air. The air conditioning duct 14 is provided with a vent door 25, a heater outlet door 26, and a defroster door 27, all of which are selectively operated in compliance with a selected air discharge mode.

Both the air mixing doors 23 and 24 are connected to an air mixing door motor 28 whereas the vent door 25, the heater outlet door 26, and the defroster door 27 are connected to a mode door motor 29. The motors 28 and 29 are connected to the control unit 40 for controlling the operation of the air conditioner 1. The motors 28 and 29 are driven in response to signals transmitted from the control unit 40, thereby adjusting the opening of the doors 23, 24, 25, 26, and 27 so that the temperature of the air and the air discharge mode may be desirably controlled.

The blower unit 11 comprises an air-intake box 31 for, by the opening and closing of a damper 32, introducing the external air or cycling the internal air, a blower fan 34 for introducing the external air or the internal air to the downstream side through the air-intake box 31, and a blower motor 35 for driving the blower fan 34. A damper driving motor 33 mounted on the damper 32 adjusts the opening of of the damper 32 so that the external air or the internal air or a mixture thereof may be introduced into the air conditioning unit 10. The amount of air can be adjusted by controlling the number of rotations of the blower motor 35.

The air conditioner 1 is of an automatic air conditioner having an automatic control function and an automatic mode selecting function. The control unit 40 for controlling the air conditioner 1 is connected to an input operation panel 60. The input operation panel 60 comprises an input portion 61 for setting the air conditioner 1 to a desired condition and a display portion 62 for displaying the operation condition of the air conditioner 1. The input portion 61 comprises a main switch 63 for turning the air conditioner 1 on and off, an automatic switch 64 for automatically operating the air conditioner 1, a fan switch 65 for manually setting the amount of air, a temperature setting switch 66 for setting the temperature in the passenger compartment, a change-over switch 67 for manually selecting either the introduction of the external air or the circulation of the internal air, and a mode switch 68 for manually setting the air discharge mode.

Upon first depression of the main switch 63, the air conditioner 1 is turned on and an economy mode (ECO mode) is set. In the economy mode, the control unit 40 decides the required cooling power, thus turning the electromagnetic clutch 9 on and off intermittently so that the compressor 2 may be intermittently operated. Upon second depression of the main switch 63, an air conditioning mode (A/C mode) for starting the air cooling operation is selected, in which the electromagnetic clutch 9 remains connected to the control unit 40 so that the compressor 2 may be continuously operated. Upon third depression of the main switch 63, the air conditioner 1 is turned off. Alternatively, a mode change-over switch for switching the operation mode of the air conditioner 1 between the A/C mode and the ECO mode may be provided in addition to the main switch 63. When the automatic switch 64 is turned on with the main switch being kept on, either the A/C mode or the ECO mode is selected according to the environmental conditions of the automotive vehicle, and in addition, the air conditioner 1 is automatically turned off.

Figure 3:
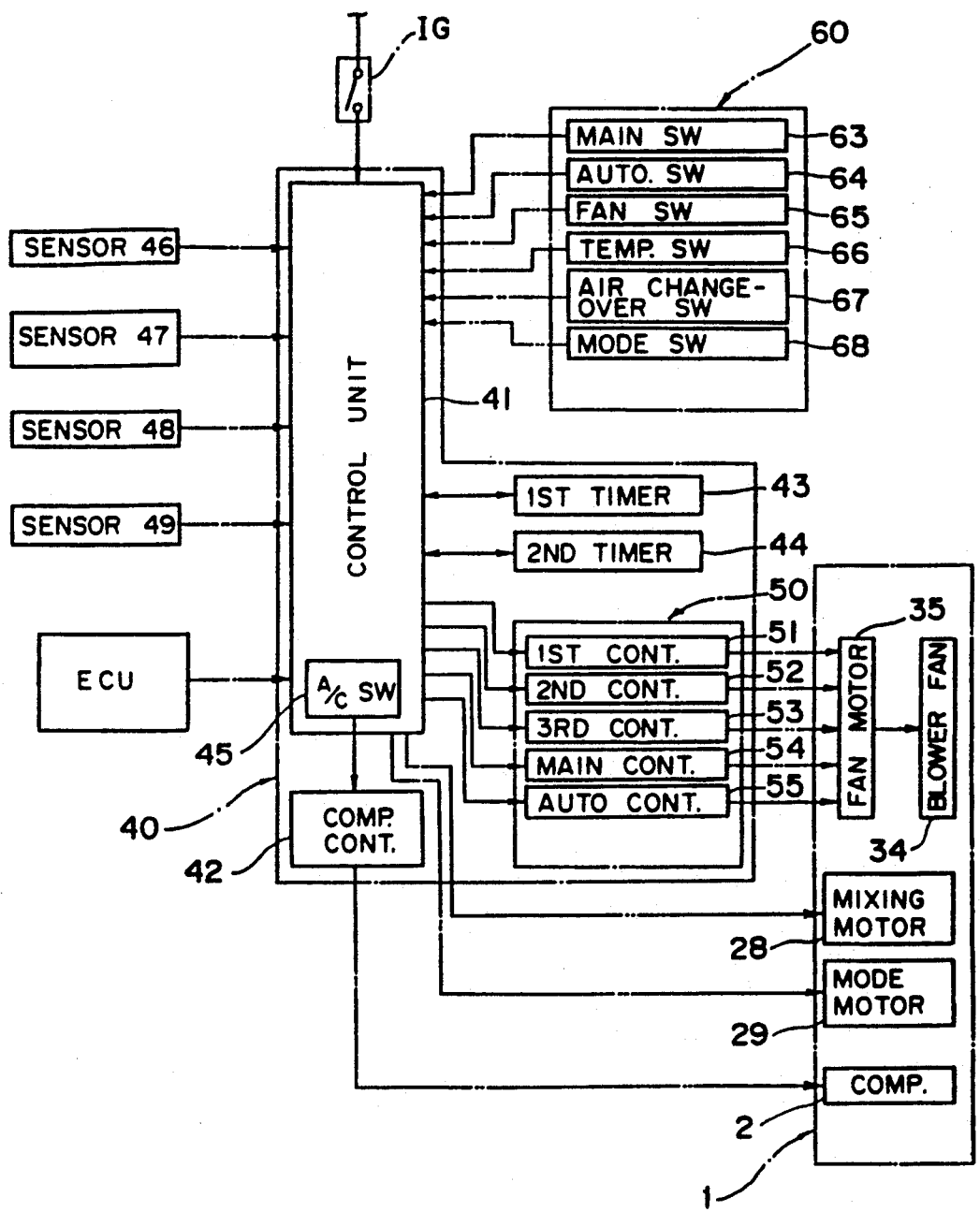
FIG. 3 is a block diagram of a control system of the air conditioner of FIG. 2.

As shown in FIG. 3, the control unit 40 comprises a decision control portion 41 connected to each switch of the input operation panel 60, a compressor control portion 42 for performing the on/off control of the compressor 2 through the electromagnetic clutch 9, a first timer circuit 43 for counting the time elapsed after the engine E has been started, a second timer circuit 44 for counting the time elapsed after the blower fan 34 has been driven, and an air quantity control portion 50 for controlling the amount of air by controlling the speed of the blower motor 35. The decision control portion 41 receives an ON/OFF signal outputted from an ignition switch IG and a signal outputted from an engine control unit ECU in addition to signals to be transmitted from the input operation panel 60. The decision control portion 41 further receives a signal outputted from a solar radiation sensor 46 (shown in FIG. 2) for detecting the amount of solar radiation a signal outputted from an evaporator sensor 47 for mainly detecting the temperature of the evaporator 6, a signal outputted from an internal air sensor 48 for detecting the temperature of the passenger compartment, and a signal outputted from an external air sensor 49 for detecting the temperature of the external air.

The decision control portion 41 includes an A/C switch portion 45 for starting the air cooling operation when the operation mode of the air conditioner 1 is set to the A/C mode. The A/C switch portion 45 is turned on when the A/C mode is selected upon depression of the main switch 63 in the manual operation mode. The A/C switch portion 45 is also turned on when the A/C mode is set according to the environmental conditions of the automotive vehicle in the automatic operation mode, thereby outputting a signal required for continuous operation of the compressor 2 to the compressor control portion 42.

When the ignition switch IG and the main switch 63 of the input operation panel 60 are turned on and the operation of the air conditioner 1 and the control unit 40 is started, signals from the sensors 46, 47, 48, and 49 and a signal from the engine control unit ECU are inputted to the decision control portion 41. Further, the operation of the air conditioner 1 is started manually or automatically according to the conditions set by the switches of the input operation panel 60. At the same time, the following controls are carried out: the openings of the air mixing doors 23 and 24 are adjusted through the air mixing door motor 28 to adjust the temperature; the mode doors 25, 26, and the defroster door 27 are opened or closed through the mode door motor 29 to set the blow-out mode; the operation of the compressor 2 is controlled by the compressor control portion 42; and the amount of air is controlled by the air quantity control portion 50.

In this embodiment, the air quantity control portion 50 comprises the following control portions: a manual control portion 54 for manually controlling the amount of air in the manual operation; an automatic control portion 55 for automatically controlling the amount of air during the automatic operation; a first control portion 51 for increasing the amount of air from a predetermined small amount to a predetermined large amount within a first predetermined period of time when a value detected by the solar radiation sensor 46 or the internal air sensor 48 is greater than a predetermined value and when no instruction for starting the compressor 2 is transmitted from the A/C switch portion 45 to the compressor control portion 42 within a first period of time T1 predetermined by the first timer circuit 43 after the starting of the engine E; a second control portion 52 for increasing the amount of air from the predetermined small amount to the predetermined large amount within a second predetermined period of time longer than the first predetermined period of time when the value detected by the solar radiation sensor 46 or the internal air sensor 48 is greater than the predetermined value and when an instruction for starting the compressor 2 is transmitted from the A/C switch portion 45 to the compressor control portion 42 within the first period of time T1 after the starting of the engine E; and a third control portion 53 for increasing the amount of air from the predetermined small amount to the predetermined large amount within a third predetermined period of time longer than the second predetermined period of time when the value detected by the solar radiation sensor 46 or the internal air sensor 48 is less than the predetermined value. The automatic control portion 55 has a function for limiting the amount of air to the small amount only within a predetermined period of time T2 at the beginning of the air cooling operation.

Figure 1:
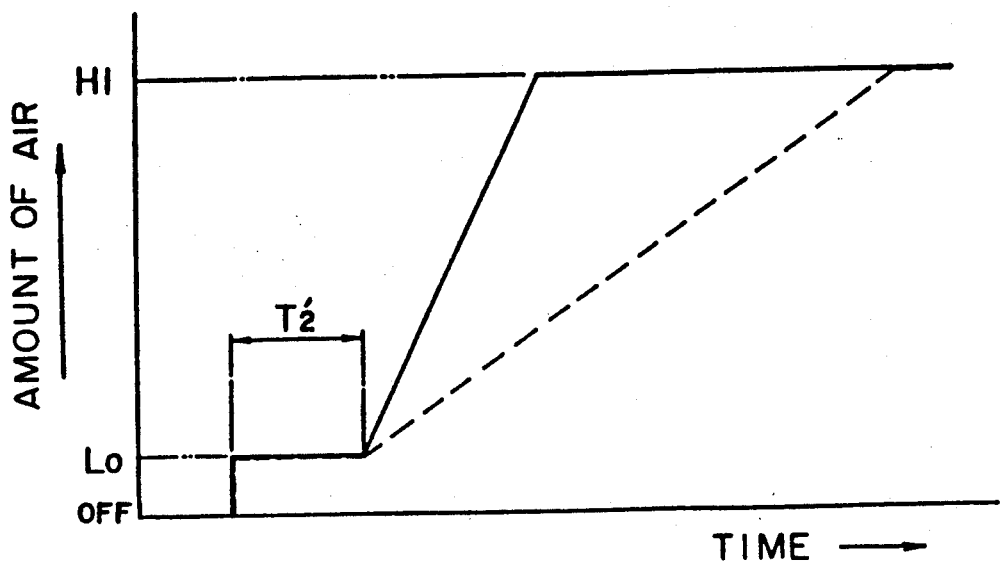
FIG. 1 is a graph indicative of the control to be carried out in a conventional air conditioner at the beginning of the air cooling operation.
Figure 6:
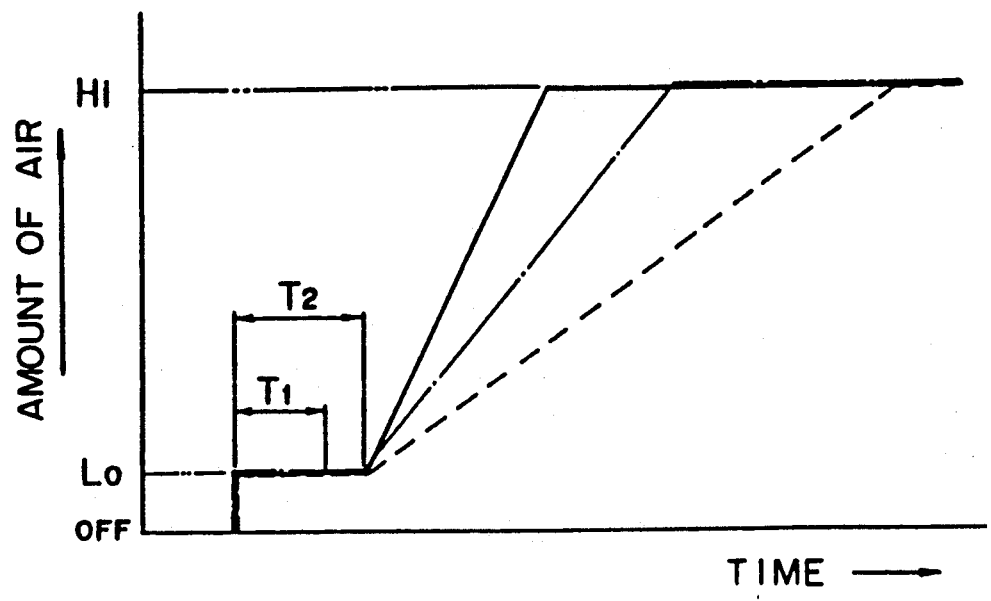
FIG. 6 is a graph similar to FIG. 1, indicative of the control to be carried out in the air conditioner of FIG. 2.

The amount of air to be controlled by the air quantity control portion 50 at the beginning of the air cooling operation is discussed hereinafter with reference to a flowchart shown in FIG. 4 and a graph shown in FIG. 6.

When the control of the amount of air starts, it is decided at step #1 whether or not the fan switch 65 is in the automatic mode and the blower fan 34 is automatically operated. If no, i.e., if the blower fan 34 is manually operated by the fan switch 65, the amount of air is manually controlled through the manual control portion 54 at step #6. If yes at step #1, the procedure proceeds to step #2 at which the second timer circuit 44 is turned on to start counting the time elapsed after the blower fan 34 has been operated. At step #3, it is decided whether or not the temperature of the evaporator 6 is less than the predetermined value. If no, the amount of air is limited to the predetermined small amount (Lo) and the air is supplied to the passenger compartment for the period of time T2 as shown in FIG. 6 (step #4). Then, it is decided at step #5 whether or not the predetermined period of time T2, for example about 7 seconds, set by the second timer circuit 44 has elapsed after the starting of air supply. If no, the air supply continues in the small amount (Lo).

If it is decided at step #3 that the temperature of the evaporator 6 is lower than the predetermined temperature or if it is decided at step #5 that the period of time T2 has elapsed, it is decided at step #7 whether or not the amount of solar radiation is greater than the predetermined value. If no, it is decided at step #8 whether or not the temperature in the passenger compartment is higher than the predetermined temperature. If no, the third control portion 53 controls the amount of air at step #13. That is, as shown by a dotted line in FIG. 6, the amount of air is increased from the small amount (Lo) to the predetermined large amount (Hi) in the longest period of time, for example approximately 30 seconds. This control gradually cools the passenger compartment and prevents a great amount of air from being introduced into the passenger compartment at the beginning of the air cooling, particularly in spring and autumn in which the amount of solar radiation is relatively small and the temperature of the passenger compartment is not so high.

If it is decided at step #7 that the amount of solar radiation is greater than the predetermined amount or at step #8 that the temperature of the passenger compartment is higher than the predetermined temperature, the procedure proceeds to step #9 at which it is decided whether or not an instruction for starting the compressor 2 is transmitted from the A/C switch portion 45 to the compressor control portion 42. If no, the first control portion 51 increases the amount of air from the low amount (Lo) to the high amount (Hi) in the shortest period of time, for example approximately 10 seconds, as shown by a solid line in FIG. 6 (step #11). This control rapidly sets the temperature of the passenger compartment to the predetermined temperature because an instruction for starting the compressor 2 is not issued from the A/C switch portion 45, though the amount of solar radiation is relatively large and the temperature of the passenger compartment is relatively high. In this case, the driver or other passengers do not feel uncomfortable even though a great amount of air is introduced into the passenger compartment.

If it is decided at step #9 that an instruction for starting the compressor 2 is issued, the procedure proceeds to step #10 at which it is decided whether or not the period of time T1, for example approximately 5 seconds, set by the first timer circuit 43 has elapsed after the starting of the engine E when an instruction for starting the compressor 2 has been issued. If yes, since the stop period of time of the compressor 2 terminates, the procedure proceeds to step #11 at which the air control is effected by the first control portion 51. If no at step #10, the procedure proceeds to step #12 at which the amount of air is gradually increased by the second control portion 52. The period of time required for performing the air control at step #12 is longer than that required at step #11 and shorter than that required at step #13. More specifically, it is very likely that hot air having a considerably high temperature is introduced into the passenger compartment when an instruction for starting the air cooling is given by the control in the automatic operation mode or by the manual operation to the A/C mode in the manual operation mode and when this instruction is given before the stop period of time T1 of the compressor elapses after the engine starting. Such a case happens when the amount of solar radiation is large and the temperature of the passenger compartment is high. Therefore, the rate of increase in the amount of air is restricted to minimize the introduction of hot air into the passenger compartment at the beginning of the air cooling.

After the air control at step #11, #12, or #13 terminates, the automatic control of the amount of air is performed by the automatic control portion 55.

Figure 4:
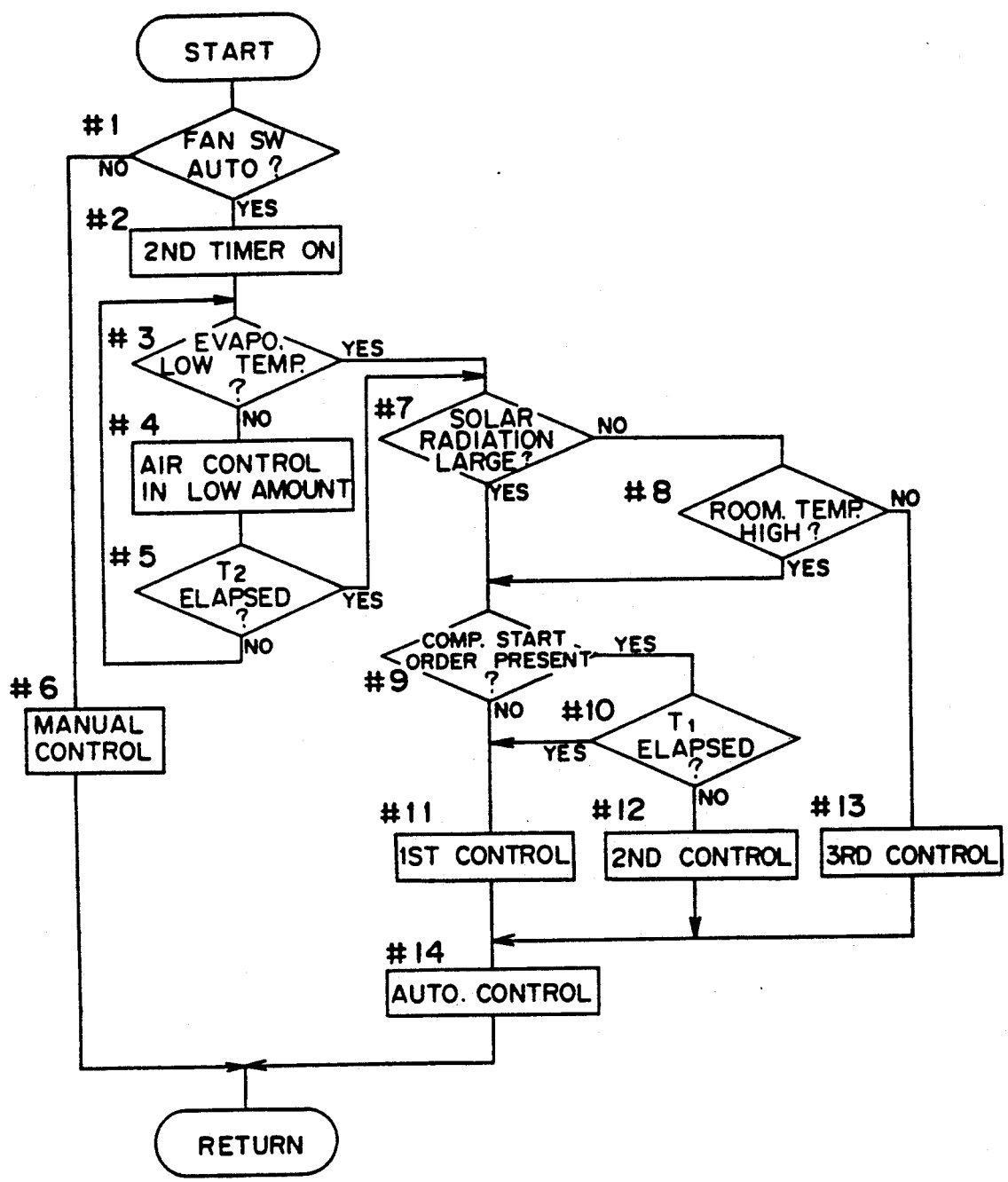
FIG. 4 is a flowchart indicative of the control of air to be fed from the air conditioner at the beginning of the air cooling operation.
Figure 5:
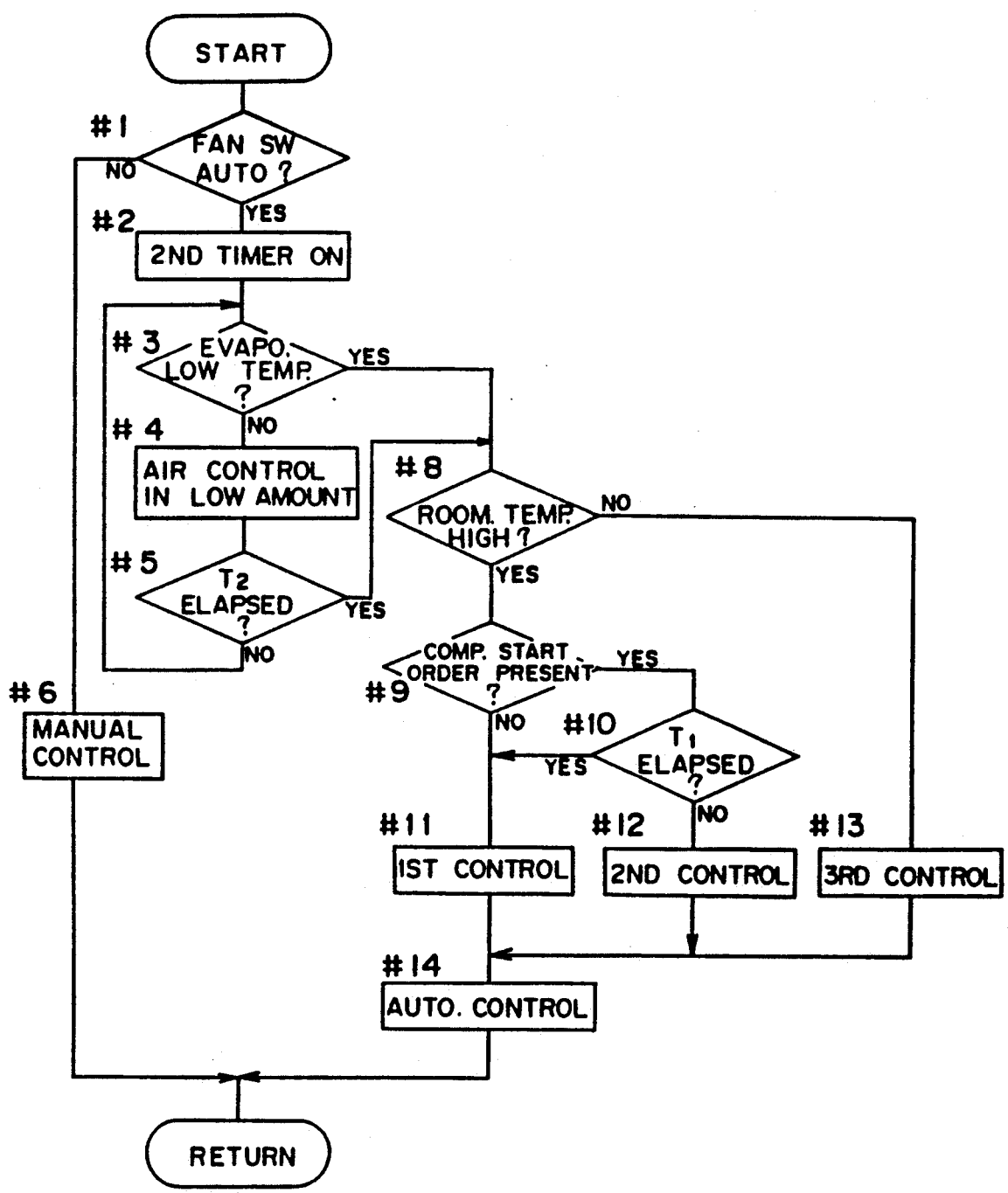
FIG. 5 is a flowchart indicative of a modification of the flowchart of FIG. 4.

FIG. 5 is a flowchart indicative of a modification of the flowchart of FIG. 4.

In the flowchart of FIG. 5, the decision at step #7 in the flowchart of FIG. 4 is deleted.

In this case, the decision whether or not the amount of solar radiation is greater than the predetermined value has no connection with the air control.

According to the above embodiments, one of the first, second, and third air controls is selected according to at least the temperature of the passenger compartment and the timing an instruction for operating the compressor is issued. However, the external temperature or other temperature relating to the temperature of the passenger compartment may be used instead of the temperature of the passenger compartment.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An air conditioner for use in an automotive vehicle comprising:
   a time counting means adapted for deciding whether or not a given period of time has elapsed after an engine of the automotive vehicle has been started;
   an air quantity limiting means for limiting an amount of air to be introduced into a passenger compartment for a given period of time after an air cooling operation has been started;
   a compressor control means adapted for prohibiting an operation of a compressor of the air conditioner for the given period of time to be decided by said time counting means;
   a temperature detecting means for detecting a temperature of the passenger compartment;
   an instructing means for starting the compressor; and
   an air quantity control means for increasing the amount of air from a first amount to a second amount greater than said first amount; said air quantity control means comprising:
   a first control means for increasing the amount of air from said first amount to said second amount within a first period of time when the temperature detected by said temperature detecting means is greater than a predetermined value and when said instruction means outputs no instruction within the given period of time decided by said time counting means; and
   a second control means for increasing the amount of air from said first amount to said second amount within a second period of time longer than said first period of time when the temperature detected by said temperature detecting means is greater than the predetermined value and when said instruction means outputs an instruction for starting the compressor within the given period of time decided by said time counting means.

2. The air conditioner according to claim 1, wherein said air quantity control means further comprises a third control means for increasing the amount of air from said first amount to said second amount within a third period of time longer than said second period of time when the temperature detected by said temperature detecting means is less than the predetermined value.

3. An air conditioner for use in an automotive vehicle comprising:
   a time counting means adapted for deciding whether or not a given period of time has elapsed after an engine of the automotive vehicle has been started;
   an air quantity limiting means for limiting an amount of air to be introduced into a passenger compartment for a given period of time after an air cooling operation has been started;
   a compressor control means adapted for prohibiting an operation of a compressor of the air conditioner for the given period of time to be decided by said time counting means;
   a solar radiation detecting means for detecting an amount of solar radiation;
   an instructing means for starting the compressor; and
   an air quantity control means for increasing the amount of air from a first amount to a second amount greater than said first amount; said air quantity control means comprising:
   a first control means for increasing the amount of air from said first amount to said second amount within a first period of time when the amount of solar radiation detected by said solar radiation detecting means is greater than a predetermined value and when said instruction means outputs no instruction within the given period of time decided by said time counting means; and
   a second control means for increasing the amount of air from said first amount to said second amount within a second period of time longer than said first period of time when the amount of solar radiation detected by said solar radiation detecting means is greater than the predetermined value and when said instruction means outputs an instruction for starting the compressor within the given period of time decided by said time counting means.

4. The air conditioner according to claim 3, wherein said air quantity control means further comprises a third control means for increasing the amount of air from said first amount to said second amount within a third period of time longer than said second period of time when the amount of solar radiation detected by said solar radiation detecting means is less than the predetermined value.

5. An air conditioner for use in an automotive vehicle comprising:
   a time counting means adapted for deciding whether or not a given period of time has elapsed after an engine of the automotive vehicle has been started;
   an air quantity limiting means for limiting an amount of air to be introduced into a passenger compartment for a given period of time after an air cooling operation has been started;
   a compressor control means adapted for prohibiting an operation of a compressor of the air conditioner for the given period of time to be decided by said time counting means;
   a temperature detecting means for detecting a temperature of the passenger compartment;
   a solar radiation detecting means for detecting an amount of solar radiation;
   an instructing means for starting the compressor; and
   an air quantity control means for increasing the amount of air from a first amount to a second amount greater than said first amount; said air quantity control means comprising:
   a first control means for increasing the amount of air from said first amount to said second amount within a first period of time when at least one of the temperature detected by said temperature detecting means and the amount of solar radiation detected by said solar radiation detecting means is greater than a predetermined value and when said instruction means outputs no instruction within the given period of time decided by said time counting means; and
   a second control means for increasing the amount of air from said first amount to said second amount within a second period of time longer than said first period of time when at least one of the temperature detected by said temperature detecting means and the amount of solar radiation detected by said solar radiation detecting means is greater than the predetermined value and when said instruction means outputs an instruction for starting the compressor within the given period of time decided by said time counting means.

6. The air conditioner according to claim 5, wherein said air quantity control means further comprises a third control means for increasing the amount of air from said first amount to said second amount within a third period of time longer than said second period of time when the temperature detected by said temperature detecting means and the amount of solar radiation detected by said solar radiation detecting means are less than respective predetermined values.

* * * * *